(12) United States Patent
Lakshmanan et al.

(10) Patent No.: US 8,916,116 B2
(45) Date of Patent: Dec. 23, 2014

(54) SEPARATION OF IRON FROM VALUE METALS IN LEACHING OF LATERITE ORES

(71) Applicants: Vaikuntam I. Lakshmanan, Mississauga, CA (US); Ramamritham Sridhar, Oakville (CA); Jonathan Chen, Toronto (CA); M. A. Halim, East York (CA); Robert DeLaat, Georgetown (CA)

(72) Inventors: Vaikuntam I. Lakshmanan, Mississauga, CA (US); Ramamritham Sridhar, Oakville (CA); Jonathan Chen, Toronto (CA); M. A. Halim, East York (CA); Robert DeLaat, Georgetown (CA)

(73) Assignee: Process Research Ortech inc., Mississauga, ON (CA)

( * ) Notice: Subject to any disclaimer, the term of this patent is extended or adjusted under 35 U.S.C. 154(b) by 0 days.

(21) Appl. No.: 13/711,874

(22) Filed: Dec. 12, 2012

(65) Prior Publication Data

US 2013/0149219 A1     Jun. 13, 2013

Related U.S. Application Data

(60) Provisional application No. 61/569,314, filed on Dec. 12, 2011.

(51) Int. Cl.
    *C22B 3/00*                  (2006.01)
    *C21B 3/00*                  (2006.01)
    *C22B 3/26*                  (2006.01)

(52) U.S. Cl.
    CPC ............... *C21B 3/00* (2013.01); *C22B 23/0423* (2013.01); *C22B 3/0021* (2013.01)
    USPC ........ 423/139; 423/22; 423/150.1; 423/150.4

(58) Field of Classification Search
    USPC ...................... 423/22, 139–141, 150.1, 150.4
    See application file for complete search history.

(56) References Cited

U.S. PATENT DOCUMENTS

| | | | | |
|---|---|---|---|---|
| 3,622,269 A | * | 11/1971 | Yamamura et al. | 423/139 |
| 3,795,727 A | * | 3/1974 | Yamamura et al. | 423/70 |
| 4,261,959 A | | 4/1981 | Kim et al. | |
| 5,571,308 A | * | 11/1996 | Duyvesteyn et al. | 75/430 |
| 7,329,396 B2 | | 2/2008 | Harris et al. | |
| 2004/0228783 A1 | * | 11/2004 | Harris et al. | 423/140 |

FOREIGN PATENT DOCUMENTS

| | | |
|---|---|---|
| CA | 1013576 | 7/1977 |
| CA | 1023560 | 1/1978 |
| CA | 1023952 | 1/1978 |
| GB | 1277304 | 6/1972 |
| WO | WO2006/043154 | 4/2006 |

OTHER PUBLICATIONS

McDonald RG et al, Hydrometallurgy 91 (2008), p. 56-59.
Rice NM, The Hydrochloric Acid Route for Nickel Laterites: A Brief History of an ongoing Project 1970-86. Leeds University Mining Association Journal, 1989, pp. 59-89.
Gibson RW et al, Proceedings of the 27th Annual Hydrometallurgy Meeting of CIM, Montreal, Aug. 1997, pp. 247-261.

* cited by examiner

*Primary Examiner* — Steven Bos
(74) *Attorney, Agent, or Firm* — Sim & McBurney

(57) ABSTRACT

The invention provides a process for the leaching of a laterite ore, concentrate, tailings or waste rock for the recovery of value metals, at least one value metal being nickel. The laterite ore or concentrate is subjected to a leaching step with a lixiviant comprising hydrochloric acid to leach nickel from the laterite ore, followed by a liquid/solids separation step. The liquid obtained is subject to solvent extraction with a dialkyl ketone, to obtain a solution rich in iron and a raffinate. Separation of iron from cobalt and nickel is obtained.

8 Claims, 1 Drawing Sheet

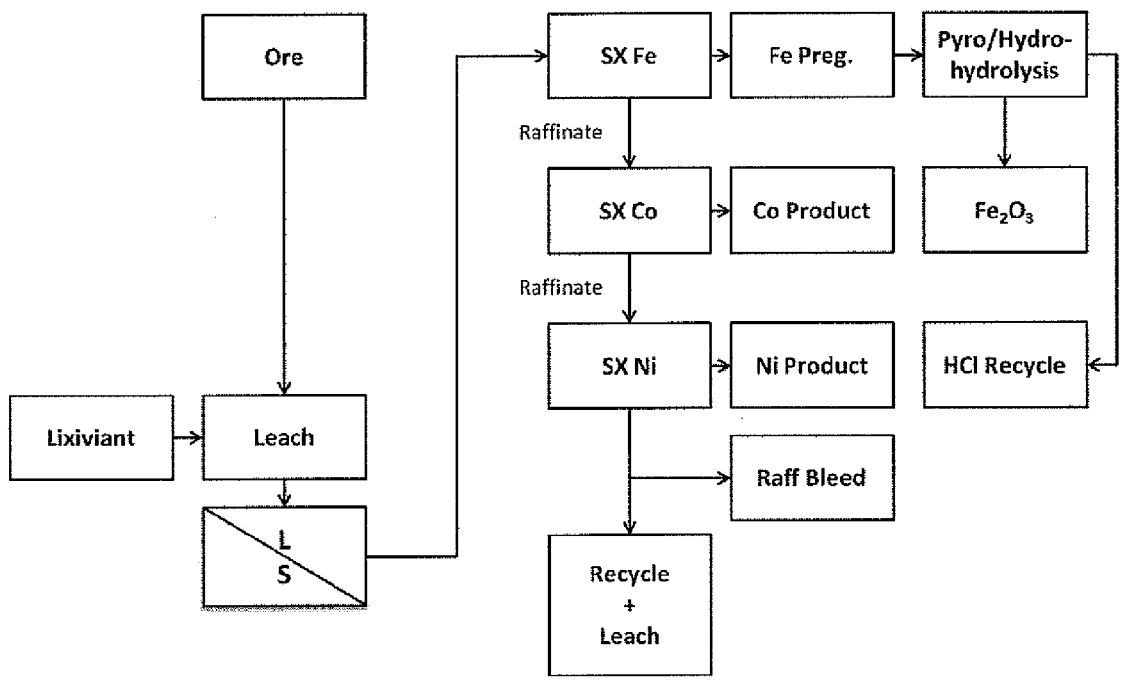

SEPARATION OF IRON FROM VALUE METALS IN LEACHING OF LATERITE ORES

REFERENCE TO RELATED APPLICATION

This application claims priority under 35 USC 119(e) from U.S. Provisional. Patent Application No. 61/569,314 filed Dec. 12, 2011.

FIELD OF THE INVENTION

The present invention relates to a process for the extraction of nickel from laterite ores and in particular to separation of iron from nickel and other value metals in solutions obtained from the leaching of laterite ores in mixed chloride-based leaching systems. Such ores may be used as is or be reduced or calcined ores, and the leaching is preferably carried out with a lixiviant of hydrochloric acid and magnesium chloride. Leach solution is subjected to liquid/solids separation, and the liquid is subjected to extraction with a dialkyl ketone to effect separation of iron from liquid (raffinate) rich in value metals, allowing recovery of both the iron and value metals. In particular, iron is separated from the liquid prior to recovery of cobalt and then nickel.

BACKGROUND OF THE INVENTION

Nickel laterite ore bodies typically have a number of layers. For example, the ore body may have a layer of overburden with a low nickel content e.g. <0.8% nickel, which is usually discarded. Under the layer of overburden may be a limonite ore zone, a saprolite ore zone and then a layer of rock. It is to be understood that the thickness and the composition of the limonite and saprolite zones may vary widely between different ore bodies. As examples of the composition of the layers, the limonitic zone may contain about 1.2-1.7% nickel, about 40% iron and 1-4% magnesium oxide and the saprolitic zone may contain about 1.6-2.3% nickel and 7-25% iron.

Ores from the saprolitic zone are frequently treated using pyrometallurgical processes to recover ferronickel and a matte with 25-75% nickel content. Most of the ores from the saprolitic zone contain less than 20% iron, and the recovery of nickel from this zone may exceed 92%. More than 80% of the iron values are essentially lost in the slag. In some instances, ores from the limonitic zone are stockpiled, preference in recovery of nickel being given to the ores with higher nickel content found in saprolitic zones.

High pressure sulphuric acid processes have been developed to treat high iron content laterite ores. The amount of sulphuric acid required is dependent on the magnesium oxide content of the ores, but is often in the range of 30-40% by weight of the ore. In practice, the cost of sulphuric acid has been low enough to make extraction with sulphuric acid economically viable, but there are expectations that the cost of sulphuric acid will rise. In this process, no attempts are made to recover the iron values which are lost in the leach residue. This results in large volumes of leach residues, including gypsum produced in the process, and disposal is a major environmental challenge. Alternate processes that do not utilize sulphuric acid, with its potential environmental issues, are of interest.

The atmospheric leaching of nickel laterite ores using chloride and bio-technologies has been discussed by R. G. McDonald and B. I. Whittington in Hydrometallurgy 91 (2008) pp 56-69. U.S. Pat. No. 7,329,396 of G. B. Harris, V. I. Lakshmanan and R Sridhar, issued 2008 Feb. 12, describes the leaching of laterite ores using a lixiviant of hydrochloric acid and magnesium chloride. Canadian Patent 1013576 of H. F. Bakker, M. C. E. Bell and R. Sridhar, issued 1977 Jul. 12 describes selectively reducing particulate oxide material, exposing moistened reduced ore to a chlorine-containing gas and leaching with water. Canadian 1023560 of H. F. Bakker and R. Sridhar, issued 1978 Jan. 3, describes selectively reducing particulate oxide material, exposing moistened reduced ore to aqueous hydrochloric acid in an amount of less than 40% of the amount to be solubilized and water leaching under oxidizing conditions. Canadian Patent 1023952 of H. F. Bakker and R. Sridhar, issued 1978 Jan. 10, describes selectively reducing particulate oxide material, exposing moistened reduced ore to sulphur dioxide and leaching with water.

There is a need for processes to extract nickel and other value metals, and also iron, from laterite ores with improved yields of nickel and which have the potential for reduced problems in recovery of value metals and reduced environmental issues with most of the values being recovered as product. In particular, there is a need to separate iron from leachate solution prior to steps to recover value metals e.g. nickel and cobalt, produce an iron product and recycle the chloride which is mainly with the iron. The presence of iron in separation steps tends to lead to formation of sludges, loss of value metals by occlusion in the sludges, environmental issues in the disposal of the sludges and difficulties in recovery and recycle of components of the lixiviant used in the leaching process.

SUMMARY OF THE INVENTION

In one aspect of the invention, the invention provides a process in which laterite ore or concentrate is subjected to a leach with a chloride-based lixiviant, especially a leach with a lixiviant of hydrochloric acid and magnesium chloride, followed by a liquid/solids separation step. The liquid is subjected to solvent extraction with dialkyl ketone to separate iron values from nickel, cobalt and other value metals.

In another aspect, the invention provides a process for the separation of iron from nickel, cobalt and other value metals in solution obtained from leaching of laterite ore with a lixiviant of hydrochloric acid and magnesium chloride. Leach solution is subjected to a liquid/solids separation step to provide a solution (leachate) of nickel, cobalt and iron and a solids that contain precious group metals (PGMs) and chromium (if present in the laterite ore). The leachate of nickel, cobalt and iron is subjected to solvent extraction to separate iron and the raffinate obtained may be subjected to further solvent extraction stages to separate cobalt from nickel, and for separate recovery of both cobalt and nickel.

Accordingly, the present invention provides a process for the leaching of a laterite ore or concentrate for the recovery of value metals, such values including iron, cobalt and nickel, comprising the steps of:

a) subjecting laterite ore or concentrate to a leaching step with a lixiviant comprising hydrochloric acid to leach value metals from the laterite ore or concentrate, followed by a liquid/solids separation step to obtain a solution containing value metals; and b) subjecting the solution obtained in step (a) to solvent extraction with a dialkyl ketone, to obtain a solution rich in iron and a raffinate. In particular, the lixiviant is a mixed chloride lixiviant. Preferably, the lixiviant of step (a) is a solution of hydrochloric acid and magnesium chloride.

In a preferred embodiment of the invention, the solution rich in iron from step b) is subjected to pyrohydrolysis or a hydrothermal process followed by a liquid/solids separation step to obtain a solids containing iron, especially $Fe_2O_3$, and a solution containing hydrochloric acid.

In another embodiment, the dialkyl ketone has alkyl groups selected from the group consisting of $C_1$-$C_6$ alkyl groups. In particular, the alkyl groups are selected from the group consisting of methyl, ethyl, propyl, isopropyl and isobutyl. Preferably, the dialkyl ketone is methylisobutyl ketone or dibutyl ketone.

In a further embodiment, the raffinate of step (b) is subjected to steps to recover value metals. In particular, the value metals are nickel and cobalt.

In a further preferred embodiment, the raffinate from step (b) is subjected to solvent extraction to obtain a solution rich in cobalt and a second raffinate. Preferably, the second raffinate is subjected to solvent extraction to obtain a solution rich in nickel.

In another embodiment, prior to step (a), the laterite ore has been subjected to a reductive roast or a calcining roast.

In a further preferred embodiment, in step a), the laterite ore or concentrate is subjected to leaching with a lixiviant comprising hydrochloric acid and magnesium chloride, the lixiviant having a maximum of 18% (mass ratio) of HCl and a chloride content of 50-400 g/L, the temperature of the leach being in the range of 40° C. up 105° C.

In an embodiment, solids up from step (a) are subjected to steps to recover PGMs.

In a preferred embodiment, a solution containing magnesium chloride is separated in the process and subjected to pyrohydrolysis to recover magnesium oxide and hydrochloric acid for recycle.

In still another preferred embodiment, the raffinate after removal of iron is subjected to selective solvent extraction to recover at least one of cobalt and nickel, said solvent comprising at least one of a crown ether, phosphine acid oxide, phosphonic acid or ester thereof, or tertiary or quaternary ammonium salt. In particular, the raffinate is subjected to sequential extraction, said sequential extraction being recovery of cobalt followed by recovery of nickel. Preferably, the solvent comprises at least one of trialkyl phosphine oxide, bis(2,4,4 trimethyl pentyl) dithiophosphinic acid, phosphinic acid, and quaternary ammonium salt and mixtures thereof.

Another aspect of the invention provides a process for the separation of iron values from nickel and other metal values in acidic mixed chloride solution obtained from laterite ore, in which the solution is subjected to solvent extraction, said solvent comprising a dialkyl ketone, to obtain a solution rich in iron and a raffinate.

In a preferred embodiment of this aspect of the invention, the dialkyl ketone has alkyl groups selected from the group consisting of $C_1$-$C_6$ alkyl groups. In particular, the alkyl groups are selected from methyl, ethyl, propyl, isopropyl, butyl and isobutyl. The preferred dialkyl ketone is methylisobutyl ketone or dibutyl ketone.

In an another embodiment, the acidic mixed chloride solution is a hydrochloric acid solution. In particular, the acidic mixed chloride solution is a solution of hydrochloric acid and magnesium chloride.

In a preferred embodiment, the raffinate obtained is subjected to selective solvent extraction to recover at least one of cobalt and nickel, said solvent comprising at least one of a crown ether, phosphine acid oxide, phosphonic acid or ester thereof, or tertiary or quaternary ammonium salt. In particular, the raffinate is subjected to sequential extraction, said sequential extraction being recovery of cobalt followed by recovery of nickel. Preferably, the solvent comprises at least one of trialkyl phosphine oxide, bis(2,4,4 trimethyl pentyl) dithiophosphinic acid, phosphinic acid, and quaternary ammonium salt and mixtures thereof.

BRIEF DESCRIPTION OF THE DRAWINGS

The present invention will be described with reference to the preferred embodiment of the invention shown in the drawing, in which:

FIG. 1 shows a flow sheet for an embodiment of the process of the present invention.

DETAILED DESCRIPTION OF THE INVENTION

A nickel laterite ore is a nickeliferous ore, and comprises nickel, iron, magnesium and silica. The ore may also contain other elements, for example, one or more of cobalt, manganese, zinc, copper, chromium and aluminum. As discussed above, nickel laterite ore bodies generally have a limonite ore zone with about 1.2-1.7% nickel, about 40% iron and 1-4% magnesium oxide and a saprolite ore zone with about 1.6-2.3% nickel and 7-25% iron. In existing commercial processes, the difference in nickel content results in hydrometallurgical processes generally being used for ore from limonitic zones and pyrometallurgical processes for ore from saprolite zones. Very few commercial processes utilize ore from both zones, since the lower nickel content material tends to be uneconomic for smelting processes, and the hydrometallurgical processes have been unable to handle significant values of magnesium.

The process of the present invention is able to treat chloride-based leach solutions obtained from the leaching of both limonite and saprolite zones discussed above, and therefore in preferred embodiments of the invention it is not necessary to discriminate between the zones in a laterite ore body.

The laterite ore may be a roasted ore, for instance a reduced or calcined ore. It is preferred that the ore be subjected to a physical up-grading or beneficiation step prior to any roasting process. Examples of methods for the physical up-grading of the ore, referred to herein as beneficiation, include by density, gravity, screening and washing. In particular embodiments of the invention, the ore subjected to roasting is in the form of a concentrate. The roasting may be a reduction roast or a calcination.

The ore or concentrate subjected to the process of the present invention is ore or concentrate that may have been subjected to a reductive roast. Steps for the reductive roasting of an ore or concentrate are known in the art. For instance, the ore or concentrate may be roasted in an atmosphere of CO and $CO_2$, for example an atmosphere of about 40:60 $CO/CO_2$ at temperatures in the range of 1200-1300° C. The ore or concentrate may be subjected to selective reduction. Other methods of reductive roasting are known. Alternatively, the ore may be a calcined ore. Methods of calcining are known.

The ore has been described above. It is a laterite ore (or concentrate), and may include one or both of the limonitic zone and saprolitic zone ores described above. It is particularly intended that the process will be operated with ore from both ore zones. However, the ore fed to the process may be obtained from another process, for example ore or concentrate that has been rejected as not suitable for processing in a process not of the invention. Other sources of laterite ore may also be used. It is understood that the ore may be a concentrate, tailings or waste rock. In addition to laterite ores, the process of the invention may be used for the extraction of nickel and cobalt from other oxide ores.

The ore may be subjected to a physical up-grading or separation or other beneficiation step to form a concentrate if the ore is not in a suitably concentrated form. This beneficiation step may include a grinding of the ore or other step. In particular, the ore may be subjected to a grinding step followed by a magnetic separation step. Other steps to upgrade and separate the ore are known. In embodiments, the laterite ore may contain chromium, especially in the form of chromites, and the physical up-grading or separation step may be used to separate chromites from the ore or concentrate to be subjected to the process. Such separation of chromites in this step would be expected to facilitate the separation and recovery of nickel and other value metals in subsequent steps in the process.

The ore is subjected to a hydrochloric acid leach, most preferably with a lixiviant of hydrochloric acid and magnesium chloride. The leaching may be conducted as a co-current step, a countercurrent step or in another manner, and is most conveniently carried out at atmospheric (ambient) pressure. It is not necessary to conduct the leaching step under pressure. The leaching step is preferably carried out with a magnesium chloride concentration of at least 100 g/L and with hydrochloric acid having a maximum concentration of 18% (mass ratio). In embodiments, the concentration of hydrochloric acid is at least 12% and especially in the range of 14-18% (mass ratio). The chloride concentration is most preferably in the range of 50-400 g/L, and especially 200-300 g/L. The Mg/HCl (magnesium to hydrochloric acid) ratio expressed in terms of mass percentage (m/m) in the leach is preferably adjusted to optimize the leach, based on for example the particular ore being leached and temperature. The Mg/HCl ratio in the lixiviant is generally in the range of 0.1-2.0, especially 0.4-1.0. Laterite ores contain magnesium oxide, and part or all of the magnesium chloride in the lixiviant may be formed by reaction of HCl in the lixiviant with magnesium oxide in the ore.

The leach is preferably carried out at a temperature in the range of 40° C. up 105° C. The leach is a highly acidic leach i.e. carried out at a low pH. A liquid/solids separation is preferably then carried out, in which the leached slurry is fed to a solid/liquid separation step to effect separation of leachate from solids. Techniques for such separation are known e.g. using a pressure or vacuum filter, counter-current decantation or centrifuge. The liquid thus obtained is subjected to steps to separate nickel and other valuable metals from the solution, as described herein. In addition to iron, nickel and cobalt, the value metals may also include aluminum, manganese and precious group metals (PGMs).

In the process of the present invention, and the aspect to which this application is particularly directed, the leachate obtained from the above solids/liquid separation steps is subjected to a step to separate value metals, and in particular to separate iron values in the leachate from cobalt and nickel, and other value metals. The preferred method of recovery of nickel and cobalt, and separation from iron, from the leachate uses solvent extraction. Preferably, a sequence of solvent extraction steps is used, to extract iron then cobalt and then nickel. For separation of iron, the leachate is subjected to solvent extraction with a dialkyl ketone. In particular, the alkyl groups of the dialkyl ketone may be $C_1$-$C_6$ alkyl groups, especially $C_1$-$C_4$ alkyl groups, examples of which are methyl, ethyl, propyl and butyl including isopropyl and isobutyl. Preferred ketones are methylisobutylketone (MIBK) and diisobutylketone (DIBK). The dialkyl ketone is preferably mixed with a diluent and a modifier. Examples of the diluent are organic phase diluents, for instance kerosenes e.g. CF-231 kerosene. Examples of the modifier are alcohol surfactants e.g. Exxal™ 13 tridecylalcohol.

After solvent extraction, the pregnant solvent containing iron is separated from the aqueous liquid (raffinate). It is preferred that the solvent extraction with the dialkyl ketone be carried out in a multi-step process i.e. raffinate from a first solvent extraction is subjected to further solvent extraction with dialkyl ketone, followed by separation of solvent from raffinate. Such steps may be repeated a number of times. The solvent extraction separates iron values, in the form of ferric iron, from the leachate of the leach solution. The remaining liquid (raffinate) contains cobalt, nickel and other metal values, as well as lixiviant i.e. hydrochloric acid and magnesium chloride if the lixiviant is hydrochloric acid/magnesium chloride, and steps may be taken to recover such metal values. In particular, it is preferred that steps be taken to separate cobalt from the raffinate using solvent extraction, and subsequently that steps be taken to separate nickel from the raffinate thus obtained. Solvents used for the selective solvent extraction of cobalt and of nickel from highly acidic mixed chloride raffinates are known. Such mixed chloride acid-raffinates are the raffinates of the present invention. The selected solvents are used alone or as a mixture.

In preferred embodiments, the liquid (leachate) from the solids/liquids separation after the leaching step is subjected to sequential steps to recover iron, cobalt and nickel. In particular, the liquid is subjected to a solvent extraction step using a ketone or alcohol or a combination of ketone and alcohol for iron separation, as described above. The pregnant solvent containing iron that is obtained is subjected to pyrohydrolysis to yield iron oxide ($Fe_2O_3$) and HCl, which is preferably recycled as part of the lixiviant of the leaching step. The raffinate from the extraction of iron is then subjected to solvent extraction using a phosphonic acid, oxide or ester, or a combination of these reagents, to obtain a solvent pregnant in cobalt. The pregnant solvent is treated for recovery of a cobalt product. The raffinate from the cobalt extraction is then subjected to solvent extraction for recovery of nickel using a phosphonic acid, sulfoxide or quaternary ammonium chloride, or a combination of these reagents. The pregnant solvent yields a nickel product. The raffinate, except some bleed, is recycled to the leaching step. For the steps of extraction of cobalt and nickel from the respective raffinates, it may be beneficial to reduce the acidity of the raffinate prior to the solvent extractions for cobalt and nickel either by controlled acid removal or extraction of an acid with a solvent. For instance with controlled acid removal, a base material may be added, especially a metal oxide. Magnesium oxide is a convenient metal oxide as magnesium is already present in various solutions of the process, and thus addition of magnesium oxide does not add to the cations in the process. Similarly, nickel oxide could be used as nickel is also in the process. Addition of other metal oxides or hydroxides could potentially cause difficulties in the recycle steps in the process, require additional bleeding or lead to contamination of the cobalt and nickel recovered from the process, and thus are less preferred.

Examples of the solvents for selective separation of cobalt and nickel from hydrochloric acid solution include crown ethers, phosphine acid oxide, phosphonic acid or esters e.g. trialkyl phosphine oxide (CYANEX® 923) and bis (2,4,4 trimethyl pentyl) phosphinic acid, (CYANEX® 272), or the tertiary amine, having characteristic claims of 8 to 20 carbon atoms, (ALAMINE® 336) or quaternary ammonium salt, N-methyl-n,n-dioctylocten-1-ammonium chloride, (ALIQUAT 336), which can be used individually or in combination. As discussed below, ALAMINE® 336 is a preferred reagent for solvent extraction of cobalt and CYANEX® 272 is a preferred reagent for solvent extraction of nickel or a combination of bis (2,4,4 trimethyl pentyl) dithiophosphinic acid (CYANEX 301) and a quaternary ammonium salt (ALIQUAT® 336).

Other methods of recovery may be used. In particular, nickel and/or cobalt and other values metals may be recovered from the leach solution by a variety of methods e.g. ion exchange, solvent extraction, electrowinning or sulfide precipitation.

The solids from the liquid/solids separation step after the hydrochloric acid leach may be subjected to steps to recover values metals therein. In particular, the solids will contain any precious group metals (PGMs) and gold in the laterite ore; the relatively mild conditions of leaching in the present invention are not expected to be conducive to the leaching of PGMs. Techniques for the recovery of PGMs and gold are known. In particular, the precious group metals (PGMs) may be leached using hydrochloric acid and magnesium chloride, with the lixiviant additionally containing oxidant to increase the Eh of the lixiviant to 600-1000 mV. Examples of oxidants that may be added include alkali metal peroxide, alkali metal perchlorate, ammonium perchlorate, ammonium perchlorate, magnesium perchlorate, magnesium chlorate, alkali metal chlorate, chlorine, alkali metal hypochlorite, hydrogen peroxide, perchloric acid and other non-sulphur-containing oxidants. Preferred oxidants are sodium chlorate and magnesium chlorate.

Some laterite ores are known to contain chromium, especially chromium in the form of chromite. Any chromium in the ore is expected to be separated as part of the solids in the liquid/solids separation step, and may be recovered therefrom. As noted above, chromite may also be separated in the physical separation step discussed above.

The process of the present invention, with the extraction of iron values from leachate, is of particular value in a process for the recovery of value metals from laterite. Such a process is illustrated in FIG. 1. In the process of FIG. 1, laterite ore (or concentrate) is fed to a leaching stage. As discussed above the ore may be calcined or subjected to a reduction roast, and it is preferably in the form of a concentrate. In the leaching step, the ore is mixed with a hydrochloric acid lixiviant. The preferred lixiviant is a solution of hydrochloric acid and magnesium chloride; such a lixiviant and the preferred leaching conditions have been described above. After the leach, the leach solution is subjected to a liquid/solids separation step, to provide a leachate and solids. The solids may contain precious group metals (PGMs); the PGMs may be recovered from the solids and steps for such recovery are known.

The leachate from the liquid/solids separation step is subjected to solvent extraction for removal of iron. Such solvent extraction is described herein. The leachate is extracted with dialkyl ketone e.g. MIBK or DIBK. The solvent is separated from remaining liquid (raffinate). The raffinate may be subjected to multiple extractions with the dialkyl ketone. This solvent extraction separates iron (as ferric iron) from the leachate, resulting in a solvent solution containing iron (an iron pregnant solution). As illustrated herein, very effective and selective removal of iron from the leachate is achieved, with the raffinate obtained containing cobalt, nickel and other value metals. The iron pregnant solution may be subjected to pyrohydrolysis or a hydrothermal process, to provide iron in the form of $Fe_2O_3$, which may be recovered and offered for sale. The dialkyl ketone may be recovered and recycled to the step for the extraction of iron from leachate. Hydrochloric acid and magnesium chloride may also be recovered, and fed to the leaching step.

As illustrated herein, the solvent extraction of the leachate with dialkyl ketone results in a raffinate with high levels of recovery of cobalt and nickel from the leachate. The example shows effectively >99% recovery of cobalt and nickel from the leachate. The raffinate may then be subjected to solvent extraction to separate cobalt from the raffinate, thereby giving a second raffinate; an example of solvent used in the extraction is Alamine™ 336. Similarly, the second raffinate (from the separation of cobalt) may be subjected to solvent extraction to separate nickel from the second raffinate; an example of solvent used in the extraction is Cyanex™ 923. Examples of other solvents for such extraction are illustrated above. Extractants used include phosphonic acid or esters e.g. trialkyl phosphine oxide (Cyanex™ 923) and bis(2,4,4 trimethyl pentyl) phosphinic acid (Cyanex™ 272) or a mixture of phosphinic acid (Cyanex™ 301) and quaternary ammonium chloride (Aliquat™ 336). The extracted cobalt and nickel may be recovered, and the solvents recycled to the respective solvent extraction steps. The raffinate from the nickel extraction step is a hydrochloric acid/magnesium chloride solution, which is preferably recycled to the leach step; a small bleed of raffinate may be used to remove undesired dissolved materials from the raffinate. Steps may also be taken to recover other value metals from the raffinate.

FIG. 1 illustrates a process for the recovery of nickel and cobalt from laterite, with removal of iron prior to steps to recover nickel and cobalt. The removal of iron simplifies the process for recovery of nickel and cobalt by removing iron from the process, thereby allowing recovery of nickel and cobalt with low levels of iron. In addition, iron is recovered as $Fe_2O_3$ which may be sold as such or converted to another form. Materials used in the process, especially ingredients in the leach solution are recovered and recycled. The process is environmentally friendly. The magnesium chloride and HCl in the lixiviant may be formed in whole or in part from fresh ingredients or be recycled or otherwise recovered in the process of the present invention. In embodiments, the leaches of the multi-step leach are carried out with the same lixiviant solution, steps being taken to remove value metals between the various leaches. HCl may be recycled in the form of an azeotrope with water. For instance, magnesium chloride in solutions recovered after the leach may be treated by pyrohydrolysis to recover magnesium oxide and an 18% wt solution of HCl. The HCl may be recycled. As is known, pyrohydrolysis may be carried out in fluid bed reactors e.g. of the type used to recover HCl from iron pickle liquor. The solution may be pre-concentrated in multiple effect evaporators.

The leaching process may be conducted continuously in at least one stirred tank reactor, or in multiple reactors. As discussed above, the leaching may also be conducted co-current or countercurrent, in whole or in part.

A particular advantage of the process of the present invention, and its embodiments, is that high rates of extraction of value metals are obtained in a leaching step that operates at atmospheric pressure. In addition, iron is separated from other value metals by solvent extraction, thereby lessening or eliminating subsequent process difficulties in recovery of, in particular, cobalt and nickel with low levels of contamination by iron. The use of atmospheric pressure results in substantial economic advantages, especially in capital costs. Value metals may be recovered. The use of chloride chemistry offers advantages in operating and capital costs of the process. Leaching agent is regenerated and recycled, especially using a pyrohydrolysis step with additional hydrochloric acid being formed from chlorine if required. Magnesium chloride may be recycled to the leaching step. Separation of iron from cobalt and nickel in laboratory tests has been very high.

The present invention is illustrated by the following examples.

Example I

Several assays of samples of a laterite ore were carried out; these assays showed that the ore contained 677-867 ppm cobalt, 1.4-4.1% chromium, 30.4-44.7% iron and 0.92-1.17% nickel. A sample of the laterite ore was leached with a lixiviant of hydrochloric acid and magnesium chloride. After the leach, the leach solution was subjected to a liquid/solids separation step. The liquid obtained was analyzed and found to contain 1.05 g/L of nickel, 60 ppm of cobalt and 43 g/L of ferric iron.

The liquid from the liquid/solids separation step was subjected to a multi-step solvent extraction with methylisobutylketone (MIBK) solution. The solution used was 40% MIBK, 30% Exxal™ 13 tridecyl alcohol and 30% CF 231 organic diluent. In each step, the liquid was subjected to solvent extraction with the MIBK solution for a period of at least 5 minutes at room temperature, after which the MIBK solution was separated, to give a pregnant strip liquor solution of MIBK and a raffinate. The solvent extraction was then repeated on the raffinate. The solvent extraction procedure was repeated four times. In each step, the ratio of organic:aqueous liquid was 1:1.

The organic and aqueous (raffinate) solutions obtained after each extraction were analyzed for the content of iron. The results were as follows, in g/L:

|  | Organic | Aqueous |
| --- | --- | --- |
| First stage | 40 | 22.5 |
| Second Stage | 21.5 | 8 |
| Third Stage | 7.5 | 1 |
| Final Stage | 1.5 | <1 |

The results allow an isotherm of the solvent extraction to be prepared.

The final raffinate was analyzed and found to contain 1.05 g/L of nickel, 60 ppm of cobalt and <44 ppm of ferric iron. The solvent extraction had removed more than 99% of the iron in the liquid from the hydrochloric acid/magnesium chloride leach. The nickel and the cobalt were in the raffinate from the solvent extraction. The pregnant strip liquor solutions were combined and then analyzed. It was found that the pregnant strip liquor solution contained 120 g/L of ferric iron and <0.01 g/L of cobalt and nickel. Thus, the solvent extraction with MIBK was very effective in separating ferric iron from cobalt and nickel values in the leach solution.

Example II

A sample of a laterite ore was leached with a lixiviant of 4N HCl containing 150 g/L of MgCl$_2$ at 105° C. for 2 hours. The solids content in the solution was 10%. The resultant leach solution was subjected to solvent extraction with DIBK (100%) in a four-stage leaching process. The iron content of the raffinate obtained after each stage of the leach was analyzed for Fe content. The results were as follows, in g/L of Fe:

|  | Organic | Aqueous |
| --- | --- | --- |
| First stage | 22 | 14.5 |
| Second Stage | 7.5 | 3 |
| Third Stage | 1.5 | <1 |
| Final Stage | <1 | <1 |

The results allow an isotherm of the solvent extraction to be prepared.

Example III

A pregnant strip liquor solution was obtained by solvent extraction of a leach solution of the type described in the previous Examples using 40% MIBK, 30% Exxal™ 13 tridecyl alcohol and 30% CF 231 organic diluent. The pregnant strip liquor solution contained 120 g/L of ferric iron, <0.01 g/L of cobalt and <0.01 g/L of nickel. The pregnant strip liquor was leached using a four-stage leach with distilled water, to strip the iron into aqueous solution. The results obtained were as follows, in g/L of Fe:

|  | Organic | Aqueous |
| --- | --- | --- |
| First stage | 26 | 120 |
| Second Stage | 14 | 98 |
| Third Stage | 2 | 51 |
| Final Stage | <1 | 7 |

The results allow an isotherm of the stripping of iron from pregnant strip solution extraction to be prepared.

Example IV

A sample of laterite ore was leached with a lixiviant of hydrochloric acid and magnesium chloride. The resultant leach solution was subjected to a liquid/solids separation step. The pregnant liquid obtained was subjected to solvent extraction using different solvents; the pregnant liquid was warmed with hot water for one minute prior to extraction. The contact time during extraction was five minutes, and the ratio of organic:aqueous was 1:1. The solvents used and the results obtained were as follows:

|  | Concentration (ppm) | | | |
| --- | --- | --- | --- | --- |
| Sample * | Fe | Co | Ni | Free Acid (N) |
| Leach Solution | 58630 | 66 | 1670 | 1.5 |
| Raffinate from Solvent #1 | 61 | 65.7 | 1667 | 0.42 |
| Raffinate from Solvent #2 |  | <4 | 1644 | 0.44 |
| Raffinate from Solvent #3 |  | <4 | 526 |  |

* Solvent #1 was MIBK/EXXAL ® 13 tridecyl alcohol/Kerosene (40/20/40)
Solvent #2 was ALAMINE ® 336/EXXAL ® 13 tridecyl alcohol/Kerosene (20/20/60)
Solvent #3 was CYANEX ® 301/ALIQUAT ® 336/EXXAL ® 13 tridecyl alcohol/Kerosene (30/10/20/40)

The results show that Fe is selectively extracted from the leach solution with minimal co-extraction of Co and Ni.

Example V

The procedure of Example IV was repeated on a different sample of ore. In this instance, the leach solution contained magnesium chloride at a concentration of 225 g/L. The solvents used and the results obtained were as follows:

|  | Concentration (ppm) | | | |
| --- | --- | --- | --- | --- |
| Sample * | Fe | Co | Ni | Free Acid (N) |
| Leach Solution | 50005 | 56.34 | 1072 | 1.5 |
| Raffinate from Solvent #1 | 65.8 | 42 | 1072 | 0.08 |

-continued

| Sample * | Concentration (ppm) | | | |
|---|---|---|---|---|
| | Fe | Co | Ni | Free Acid (N) |
| Raffinate from Solvent #2 | 65.8 | 9.7 | 1072 | |
| Raffinate from Solvent #3 | 3 | 1 | 102 | |

* Solvent #1 was MIBK/DIBK/2-octadecanol/EXXAL ® 13 tridecyl alcohol/EXXSOL ® D-80 aliphatic hydrocarbon solvent in a ratio of 5/35/40/20. A four-stage extraction was used, and in each extraction the ratio of organic:aqueous was 2:1
Solvent #2 was ALAMINE ® 336/EXXAL ® 13 tridecyl alcohol/kerosene (20/20/60) at an organic:aqueous ratio of 1:1
Solvent #3 was CYANEX ® 301/ALIQUAT ® 336/EXXAL ® 13 tridecyl alcohol/kerosene (30/10/20/40)

The results show that each solvent used selectively extracts Fe, Co and Ni from aqueous solution.

Example VI

A raffinate that had previously undergone Fe and Co extraction similar to the sample prepared in Example IV was treated with a solvent to remove the remaining Ni. The pregnant liquor was characterized by a high free acid level of 0.1N. The pregnant liquor was warmed with hot water to a temperature of 35-40° C. prior to extraction. The contact time during extraction was 5 minutes and the ratio of organic: aqueous was 1:1. The results obtained were as follows:

| Sample * | Concentration (ppm) | | | |
|---|---|---|---|---|
| | Fe | Co | Ni | Free Acid (N) |
| Leach Solution | <50 | <4 | 1080 | 0.1 |
| Raffinate from Solvent #1 | <50 | <4 | 50 | 0.03 |

* Solvent #1 was Cyanex ™ 923 (100%)

The results show that Ni can be extracted at high acid levels without removal of acid after removal of Co.

The invention claimed is:

1. A process for the leaching of a laterite ore or concentrate for the recovery of value metals, including iron, cobalt and nickel, comprising the steps of:
   a) subjecting laterite ore or concentrate to a leaching step with a lixiviant comprising hydrochloric acid and magnesium chloride to leach value metals from the laterite ore or concentrate, followed by a liquid/solids separation step to obtain a solution containing value metals, said lixiviant having a maximum of 18% by mass of hydrochloric acid and a chloride content of 50 to 400 g/L, the temperature of the leach being in the range of 40° to 105° C.; and
   b) subjecting the solution to solvent extraction with a dialkyl ketone, to obtain a solution rich in iron and a raffinate, said dialkyl ketone having alkyl groups selected from the group consisting of $C_1$-$C_6$ alkyl groups, and subjecting the solution rich in iron to pyrohydrolysis or a hydrothermal process followed by a liquid/solid separation step to obtain a solid containing iron and a solution containing hydrochloric acid and magnesium chloride;
   c) subjecting raffinate from step b) to solvent extraction to obtain a solution rich in cobalt and a second raffinate; and
   d) subjecting the second raffinate from step c) to solvent extraction to obtain a solution rich in nickel.

2. The process of claim 1 in which the alkyl groups are selected from the group consisting of methyl, ethyl, propyl, isopropyl and isobutyl.

3. The process of claim 1 in which the dialkyl ketone is methylisobutyl ketone or dibutyl ketone.

4. The process of claim 1 in which, prior to step (a), laterite ore has been subjected to a reductive roast or a calcining roast.

5. The process of claim 1 in which solids from step (a) are subjected to steps to recover PGMs.

6. The process of claim 1 in which a solution containing magnesium chloride is separated in the process and subjected to pyrohydrolysis to recover magnesium oxide and hydrochloric acid for recycle.

7. The process of claim 1 in which the raffinate so obtained is subjected to selective solvent extraction to recover at least one of cobalt and nickel, said solvent comprising at least one of a crown ether, phosphine acid oxide, phosphonic acid or ester thereof, or tertiary or quaternary ammonium salt.

8. The process of claim 1 in which the solvent used in steps (b) and (c) comprises trialkyl phosphine oxide, bis (2,4,4 trimethyl pentyl) phosphinic acid, phosphinic acid, water-soluble trioctyl/decyl amine or mixtures thereof.

* * * * *